(12) United States Patent
Nakano et al.

(10) Patent No.: US 9,183,484 B2
(45) Date of Patent: Nov. 10, 2015

(54) IC TAG

(71) Applicant: NOK CORPORATION, Tokyo (JP)

(72) Inventors: Tomoko Nakano, Fujisawa (JP); Naohiro Fujisawa, Fujisawa (JP); Keiichi Miyajima, Fujisawa (JP); Kenji Minoshima, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 14/394,485

(22) PCT Filed: Apr. 15, 2013

(86) PCT No.: PCT/JP2013/061215
§ 371 (c)(1),
(2) Date: Oct. 15, 2014

(87) PCT Pub. No.: WO2013/157525
PCT Pub. Date: Oct. 24, 2013

(65) Prior Publication Data
US 2015/0122891 A1    May 7, 2015

(30) Foreign Application Priority Data
Apr. 18, 2012    (JP) .................................. 2012-095076

(51) Int. Cl.
*G06K 19/02*        (2006.01)
*G06K 19/077*       (2006.01)

(52) U.S. Cl.
CPC ........ *G06K 19/07728* (2013.01); *G06K 19/025* (2013.01); *G06K 19/0775* (2013.01); *G06K 19/07722* (2013.01)

(58) Field of Classification Search
CPC ......... G06K 19/02; G06K 7/08; G06K 19/06; G06K 5/00; G06F 17/00

USPC .......................... 235/488, 380, 375, 492, 451
See application file for complete search history.

(56) References Cited

U.S. PATENT DOCUMENTS

| | | | |
|---|---|---|---|
| 2005/0128086 A1* | 6/2005 | Brown et al. ............... | 340/572.8 |
| 2006/0290514 A1 | 12/2006 | Sakama et al. | |
| 2007/0273515 A1 | 11/2007 | MacKenzie et al. | |

(Continued)

FOREIGN PATENT DOCUMENTS

| | | | |
|---|---|---|---|
| JP | 2000148948 A | 5/2000 | |
| JP | 2005056362 A | 3/2005 | |

(Continued)

OTHER PUBLICATIONS

Korean Office Action dated Sep. 1, 2015.

*Primary Examiner* — Edwyn Labaze
(74) *Attorney, Agent, or Firm* — Harness, Dickey & Pierce, P.L.C.

(57) ABSTRACT

The disclosure prevents, with improved reliability, an IC tag from being broken, while ensuring overall flexibility of the IC tag. The IC tag 100 is provided with a covering 140 made of an elastic material, which covers at least the side of the IC tag 100 on which an IC chip 130 is mounted and has a thickness that is larger in its portion 140*a* that covers a region about the IC chip 130 than in its portion 140*b* that covers a region outside the region about the IC chip 130. The covering 140 is configured in such a way that at least a part of a boundary of the portion 140*a* of the covering that covers the region about the IC chip 130 and the portion 140*b* of the covering that covers the region outside the region about the IC chip 130 has a curved shape.

1 Claim, 9 Drawing Sheets

(56) References Cited

U.S. PATENT DOCUMENTS

| | | |
|---|---|---|
| 2008/0042852 A1 | 2/2008 | Baba et al. |
| 2009/0115611 A1 | 5/2009 | Kobayashi et al. |
| 2010/0123011 A1 | 5/2010 | Baba et al. |
| 2010/0258640 A1 | 10/2010 | Takeuchi et al. |
| 2011/0272470 A1 | 11/2011 | Baba et al. |

FOREIGN PATENT DOCUMENTS

| | | | |
|---|---|---|---|
| JP | 2007004323 A | | 1/2007 |
| JP | 2007148735 A | | 6/2007 |
| JP | 2008299465 A | | 12/2008 |
| JP | 2009116670 A | | 5/2009 |
| JP | 2009277256 A | | 11/2009 |
| JP | 2010067116 A | | 3/2010 |
| JP | 2010122764 A | | 6/2010 |
| JP | 2010250504 A | | 11/2010 |
| JP | 2012212198 A | | 11/2012 |
| KP | 20080013676 A | | 2/2008 |
| WO | 2008047436 A1 | | 4/2008 |

\* cited by examiner

IC TAG

CROSS-REFERENCE TO RELATED APPLICATIONS

This application is a National Stage of International Application No. PCT/JP2013/061215, filed Apr. 15, 2013, which claims priority to Japanese Application No. 2012-095076, filed Apr. 18, 2012. The entire disclosures of each of the above applications are incorporated herein by reference.

FIELD

The present disclosure relates to an IC tag used in RFID.

BACKGROUND

Hither-to, the RFID technology has been widely used for the purpose of product management. To utilize the RFID technology, IC tags are attached to linen goods such as uniforms or bed sheets used in a hotel. The IC tags attached to such goods need to have flexibility. For this reason, an IC tag made up of a film member provided with an antenna part and an IC chip mounted thereon is used.

In the case where IC tags are attached to linen goods, the IC tags will be washed with the linen goods in the laundry. Therefore, the IC tags attached to such goods need to have strength against external forces and resistance against solutions used in the washing process. As a technique employed to meet this requirement, it is known to cover the body of an IC tag with a covering made of a rubber, resin or the like (see for example, Japanese Patent Application Laid-Open No. 2005-056362 or Japanese Patent Application Laid-Open No. 2007-148735).

However, if the covering that covers the entirety of the IC tag body is not sufficiently thick, the IC chip may break. Moreover, if strong bending and/or twisting force or a pushing load acts on the IC tag in the dewatering step in the washing process, stress will concentrate to a portion of connection of the IC chip and the antenna part, possibly resulting in breakage of the portion of connection. On the other hand, if the covering that covers the entirety of the IC tag is too thick, a problem of insufficient flexibility of the IC tag will arise.

As a solution, it is known to make the thickness of the covering for the portion of the body of the IC tag about the IC chip larger than thickness of the covering for the portion outside the portion about the IC chip (see for example, Japanese Patent Application Laid-Open No. 2007-004323 or Japanese Patent Application Laid-Open No. 2010-122764). Such IC tags can have sufficient overall flexibility, while achieving protection of the portion of connection of the IC chip and the antenna part by relatively thick covering.

PRIOR ART DOCUMENTS

Patent Documents

Additional known patent documents include:
Japanese Patent Application Laid-Open No. 2010-250504;
Japanese Patent Application Laid-Open No. 2009-277256;
Japanese Patent Application Laid-Open No. 2000-148948; and
Japanese Patent Application Laid-Open No. 2010-067116.

SUMMARY

Problems to be Solved by the Disclosure

However, if there is a difference in the thickness of the covering for the body of the IC tag between the region about the IC chip and the region outside thereof, concentration of stress occurs at the boundary of these portions when an external force acts on the IC tag, likely leading to bending at the boundary. This will be described with reference to FIGS. 12(a) and 12(b). FIG. 12 shows the basic construction of an IC tag according to a prior art, where FIG. 12(a) is a plan view, and FIG. 12(b) is a cross sectional view taken along line A-A in FIG. 12(a).

The IC tag 200 according to this prior art has a film member 210, an antenna part 220, an IC chip 230, and a covering 240. The antenna part 220 is provided on a film member 210. The IC chip 230 is mounted on the film member 210 and connected to the antenna part 220. The covering 240 is made of an elastic material and covers the entirety of the side of the body of the IC tag on which the IC chip 230 is mounted. The covering 240a that covers the region about the IC chip 230 is thicker than the covering 240b that covers the region outside the region about the IC chip 230. The boundary (drawn by broken lines in FIG. 12) of the covering 240a having a relatively large thickness and the covering 240b having a relatively small thickness is substantially straight.

If an external force such as bending force or twisting force acts on the IC tag 200 having the above-described structure, stress will concentrate at the boundary of the covering 240a and the covering 240b, likely leading to bending along the boundary. If bending of the IC tag 200 at this boundary occurs repeatedly, a break in the antenna part 220, breakage of the film member 210, and/or separation of the covering 240 can occur.

The present disclosure has been made in view of the above-described problem, and an object of the present disclosure is to prevent breakage of the IC tag with improved reliability while maintaining overall flexibility of the IC tag.

Means for Solving the Problems

An IC tag according to a first aspect of the present disclosure comprises: a film member; an antenna part provided on the film member; an IC chip mounted on the film member in such a way as to be connected with the antenna part, wherein the IC tag is provided with a covering made of an elastic material that covers at least a side of the IC tag on which the IC chip is mounted, a portion of the covering that covers a region about the IC chip being thicker than a portion of the covering that covers a region outside the region about the IC chip, and the covering is configured in such a way that at least a part of a boundary of the portion of the covering that covers the region about the IC chip and the portion of the covering that covers the region outside the region about the IC chip has a curved shape.

An IC tag according to a second aspect of the present disclosure comprises: a film member; an antenna part provided on the film member; an IC chip mounted on the film member in such a way as to be connected with the antenna part, wherein the IC tag is provided with a covering made of an elastic material that covers at least a side of the IC tag on which the IC chip is mounted, a portion of the covering that covers a region about the IC chip being thicker than a portion of the covering that covers a region outside the region about the IC chip, and the covering is configured in such a way that when an external force acts on the IC tag, the location at which stress concentrates changes continuously in at least a part of a boundary of the portion of the covering that covers the region about the IC chip and the portion of the covering that covers the region outside the region about the IC chip.

In the present disclosure, since the portion of the covering that covers the region about the IC chip is thicker than the portion of the covering that covers the region outside the region about the IC chip, the IC tag can have overall flexibility, while the connection of the IC chip and the antenna part is protected by the covering having a relatively large thickness.

In the IC tag according to the present disclosure also, when an external force such as bending force or twisting force acts on the IC tag, stress tends to concentrate at the boundary of the covering that covers the region about the IC chip and the covering that covers the region outside the region about the IC chip (or the boundary of the relatively thick portion of the covering and the relatively thin portion of the covering). However, in the IC tag according to the present disclosure, at least a part of the boundary is curved in shape or configured in such a way that the location at which stress concentrates changes continuously. In consequence, the location at which bending of the IC tag occurs will change.

Thus, in the IC tag according to the present disclosure, bending of the IC tag is prevented from occurring repeatedly at the same location. Therefore, it is possible to prevent, with improved reliability, a break in the antenna part, breakage of the film member, or separation of the covering in the IC tag from occurring.

In the IC chip according to the present disclosure, a protruding portions protruding beyond the top surface of the covering that covers the IC chip may be provided on the covering that covers the region about the IC chip, at positions opposed to each other with the IC chip therebetween or at positions surrounding the IC chip. With this configuration, when a pushing load acts on the IC tag from above the IC chip, stress will concentrate at the portions of the covering provided with the protruding portions. Therefore, stress acting on the IC chip and stress acting on the connection of the IC chip and the antenna part can be reduced. In consequence, breakage of the IC chip and breakage of the connection of the IC chip and the antenna part can be prevented from occurring with improved reliability.

In the case where not only the side of the IC tag on which the IC chip is mounted but also the other side is also covered in its entirety with a covering made of an elastic material, the thickness of the covering that covers the other side may be designed to be smaller than the thickness of the covering that covers the side on which the IC chip is mounted. This configuration allows the IC tag to be flexible while preventing it from breaking on the side other than the side on which the IC chip 130 is mounted.

The side of the IC tag other than the side on which the IC chip is mounted may be covered with a resin film. This also allows the IC tag to be flexible while preventing it from breaking on the side other than the side on which the IC chip 130 is mounted.

Advantageous Effect of the Disclosure

The present disclosure can control breakage of an IC tag with improved reliability while ensuring overall flexibility of the IC tag.

DRAWINGS

FIG. 1(a), FIG. 1(b), and FIG. 1(c) show the basic construction of an IC tag according to a first embodiment.

Figure 5A:
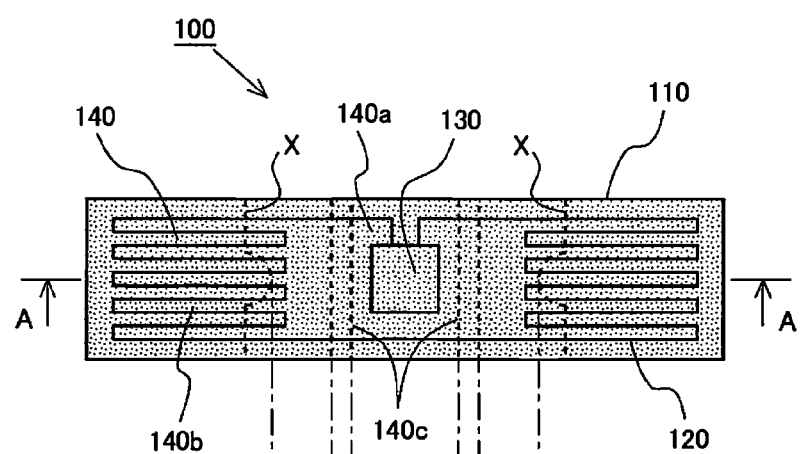
Figure 5B:
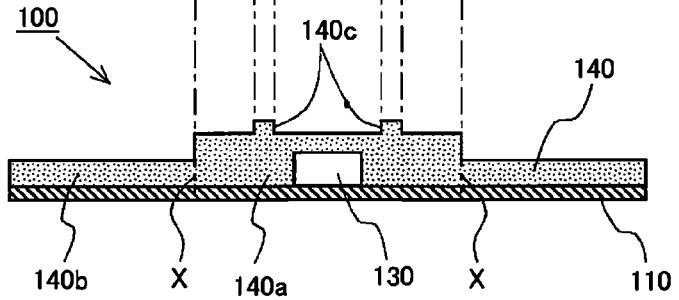

FIG. 5(a) and FIG. 5(b) show the basic construction of an IC tag according to a second embodiment.

Figure 6:
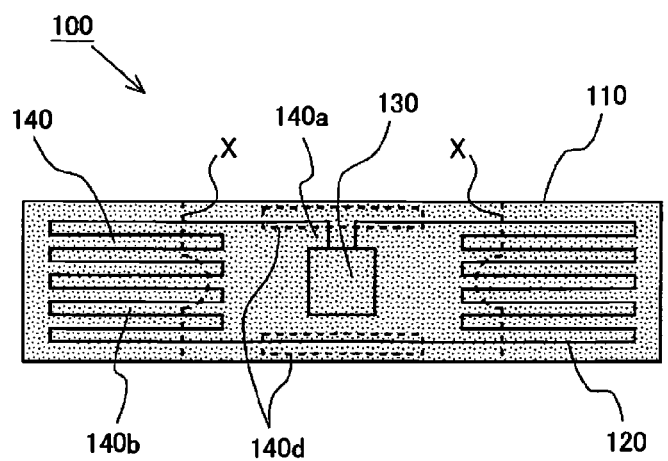

FIG. 6 shows the basic construction of an IC tag according to a first modification of the second embodiment.

Figure 7:
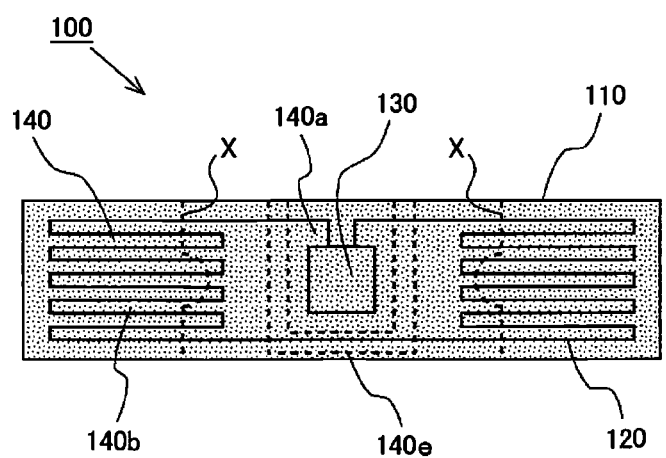

FIG. 7 shows the basic construction of an IC tag according to a second modification of the second embodiment.

Figure 8:
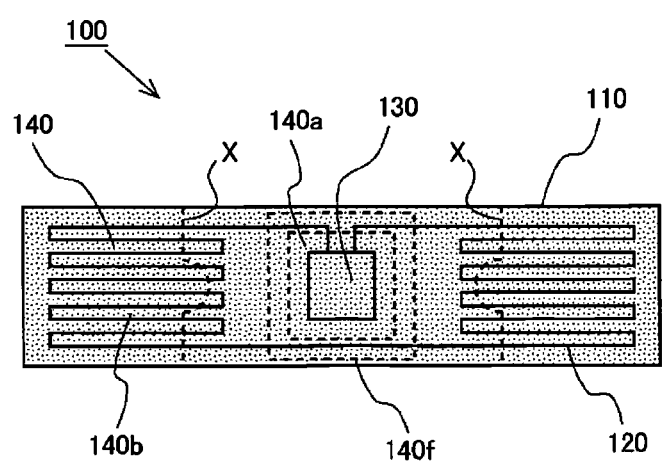

FIG. 8 shows the basic construction of an IC tag according to a third modification of the second embodiment.

Figure 9A:
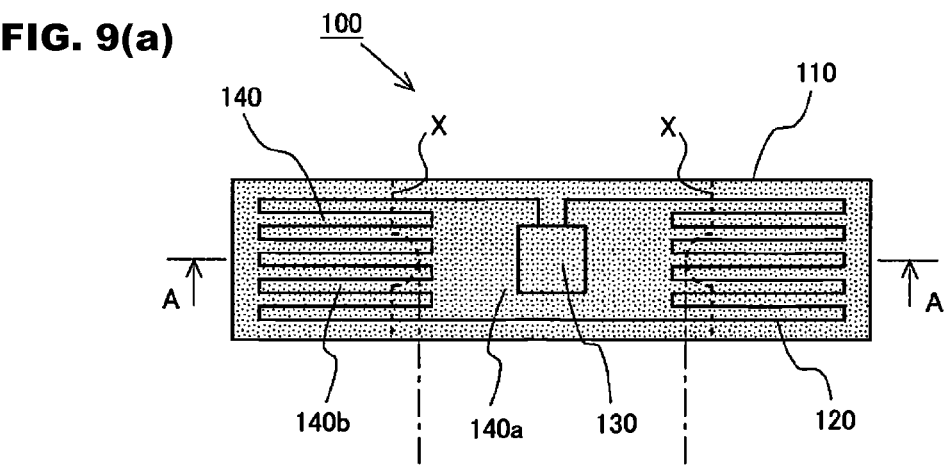
Figure 9B:
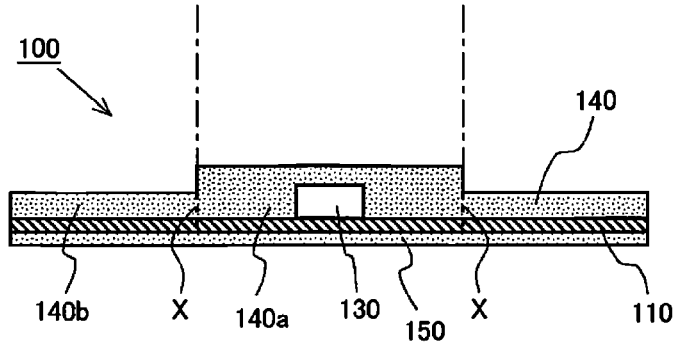

FIG. 9(a) and FIG. 9(b) show the basic construction of an IC tag according to a third embodiment.

Figure 10A:
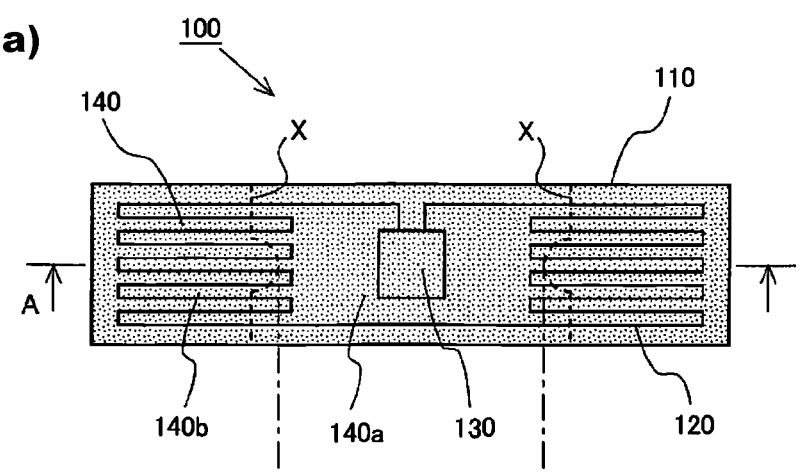
Figure 10B:
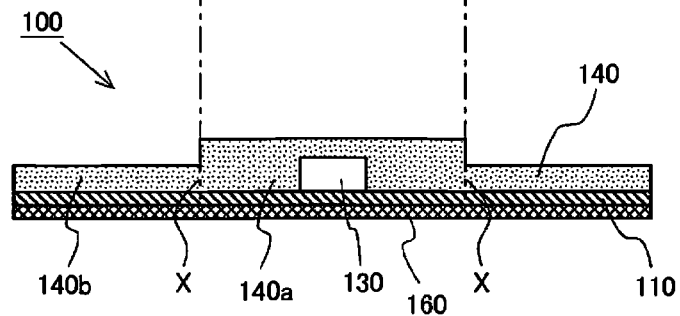

FIG. 10(a) and FIG. 10(b) show the basic construction of an IC tag according to a modification of the third embodiment.

Figure 11A:
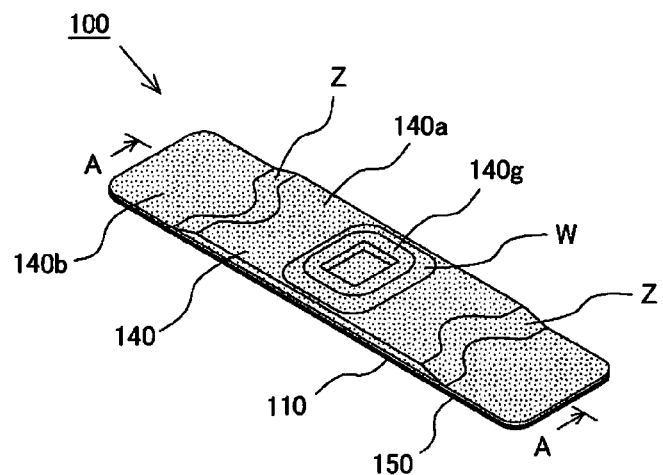
Figure 11B:
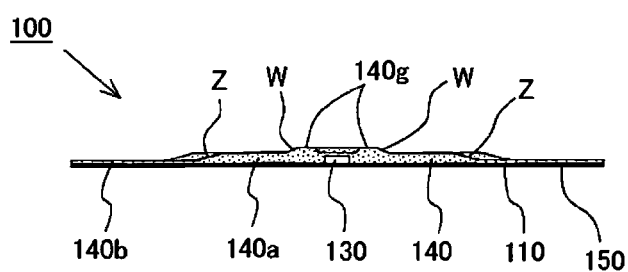

FIG. 11(a) and FIG. 11(b) show the basic construction of an IC tag according to a fourth embodiment.

Figure 12A:
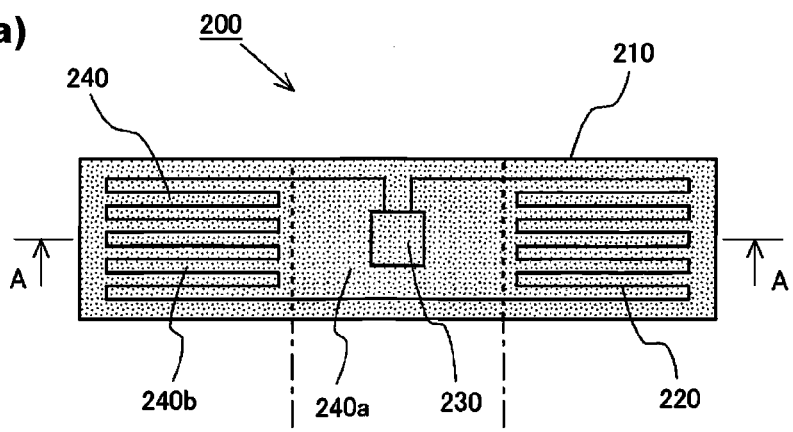
Figure 12B:
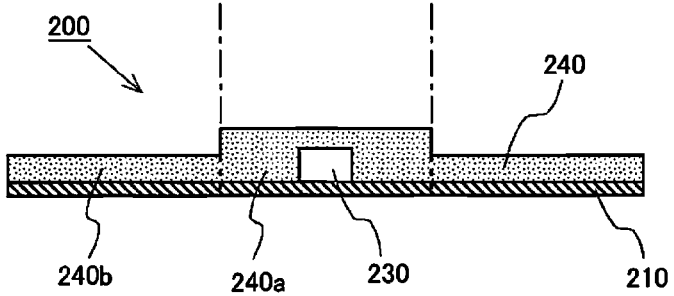

FIG. 12(a) and FIG. 12(b) show the basic construction of an IC tag according to a prior art.

DETAILED DESCRIPTION

In the following, specific embodiments of the present disclosure will be described with reference to the drawings. The dimensions, materials, shapes, relative arrangements, and other features of the components that will be described in connection with the embodiments are not intended to limit the technical scope of the present disclosure only to them, unless particularly stated.

21 First Embodiment>
(Basic Construction of IC Tag)

Figure 1A:
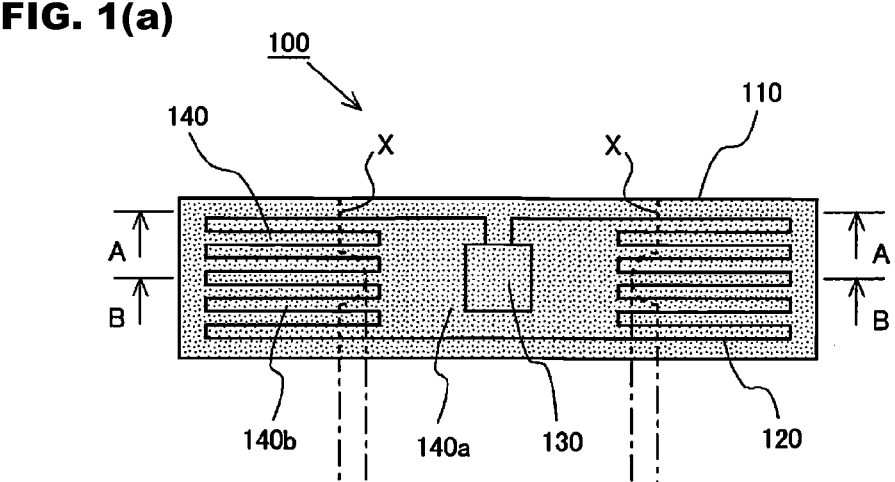
Figure 1B:
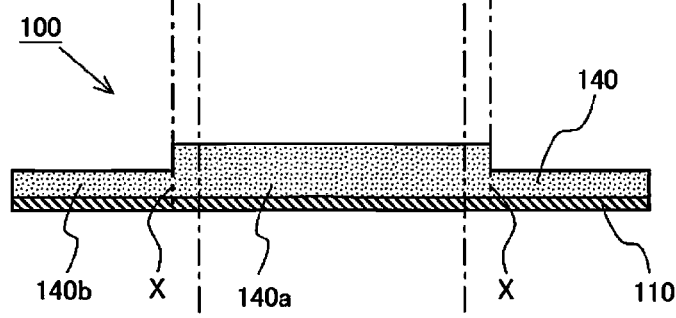
Figure 1C:
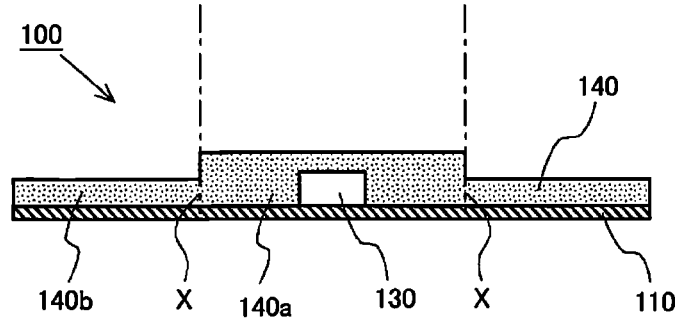

FIG. 1 shows the basic construction of an IC tag according to an embodiment. The IC tag according to this embodiment is used in RFID. In particular, it is suitably used as one attached to a linen object. FIG. 1(a) is a plan view of the IC tag according to the embodiment seen from the side on which an IC chip is mounted. FIGS. 1(b) and 1(c) are schematic cross sectional views of the IC tag according to the embodiment. FIG. 1(b) is a cross sectional view taken along line A-A in FIG. 1(a), and FIG. 1(c) is a cross sectional view taken along line B-B in FIG. 1(a).

The IC tag 100 includes a film member 110 such as a resin film, an antenna part 120 provided on the film member 110, and an IC chip 130 mounted on the film member 110 in such a way as to be connected to the antenna part 120.

Examples of the material of the film member 110 may include polyethylene terephthalate, polyethylene naphthalate, and polyimide. The antenna part 120 can be formed on the film member 110 using a typical technique for making an FPC (flexible printed circuit). Because this technique is already known, it will not be described in detail. For example, the antenna part 120 can be formed by etching a copper foil on a resin film or by screen printing on a resin film. The film member 110 is composed of a base film and a cover film that are laminated together, and the antenna part 120 is provided between the base film and the cover film.

The IC chip 130 is mounted on the film member 110 on which the antenna part is formed, at a substantially central position. The antenna part 120 is connected to one of the sides of the IC chip 130 opposed to each other in the direction of the short side of the film member 110.

In this embodiment, the side of the IC tag 100 on which the IC chip 130 is mounted is covered, in its entirety, with a covering 140 made of an elastic member. Examples of the material of the covering 140 may include silicone rubber, fluororubber, nitrile rubber, butyl rubber, and EPDM. Although it is not always necessary to cover the entirety of the side of the IC tag 100 on which the IC chip 130 is mounted, it is necessary to cover the IC chip 130 and the portion of the film member 110 provided with the antenna part 120 with the covering 140 in order to protect the IC chip 130 and the antenna part 120.

In this embodiment, the portion 140a of the covering 140 that covers the region about the IC chip 130 with respect to the direction along the long side of the IC tag 100 is thicker than the portions 140b of the covering 140 that cover the regions outside the region about the IC chip 130. (The former portion will be hereinafter referred to as the central covering portion, and the latter portion will be referred to as the outer covering portion).

In this embodiment, the covering 140 is configured in such a way that the boundaries X (drawn by broken lines in FIGS. 1(a), 1(b), and 1(c)) of the central covering portion 140a and the outer covering portions 140b have curved shapes. Specifically, the central covering portion 140a is concaved in the region near its center with respect to the direction of the short side of the IC tag 100, so that the boundaries X of the central covering portion 140a and the outer covering portions 140b are curved inwardly. The curved portions of the boundaries X of the central covering portion 140a and the outer covering portions 140b are located in such a way that the IC chip 130 is located between them.

(Advantages of the IC Tag According to this Embodiment)

Figure 2:
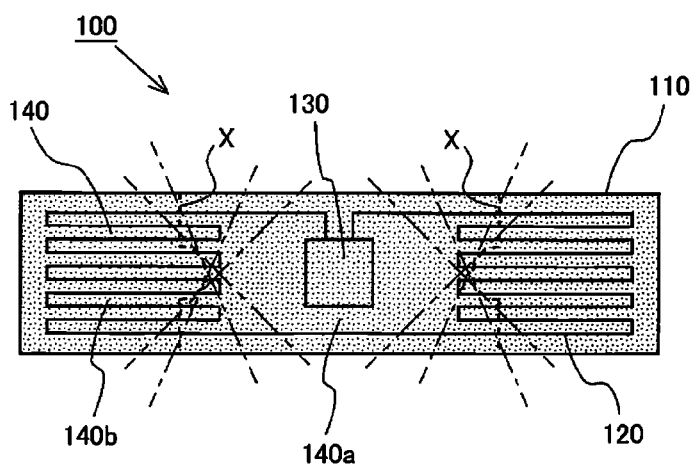
FIG. 2 is a first diagram showing exemplary locations at which bending tends to occur when an external force acts on the IC tag according to the first embodiment.
Figure 3:
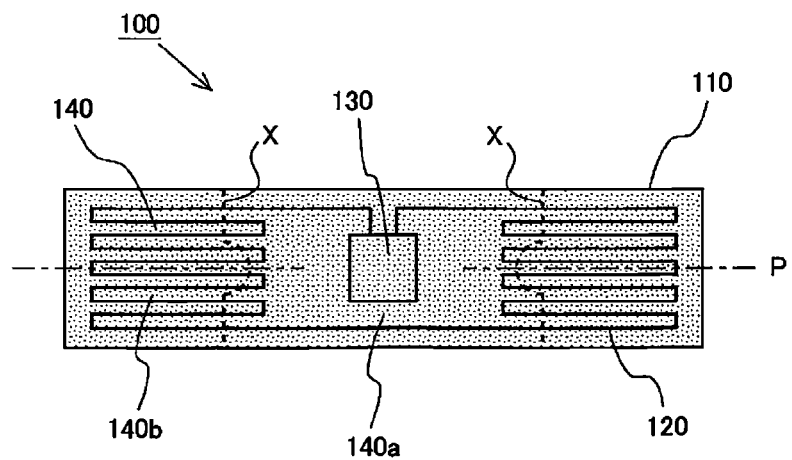
FIG. 3 is a second diagram showing exemplary locations at which bending tends to occur when an external force acts on the IC tag according to the first embodiment.

Advantages of the IC tag according to this embodiment will be described with reference to FIGS. 2 and 3. FIGS. 2 and 3 are diagrams illustrating exemplary portions that tend to bend when an external force acts on the IC tag according to the embodiment. In FIGS. 2 and 3, alternate long and short dash lines indicate portions that tend to bend when an external force acts thereon.

In the case of the IC tag 100 according to this embodiment, the central covering portion 140a is thicker than the outer covering portions 140b. Therefore, it is possible to maintain overall flexibility of the IC tag 100 while protecting the portion of connection of the IC chip 130 and the antenna part 120 with the relatively thick covering portion.

When an external force such as bending or twisting force acts on the IC tag 100, stress tends to concentrate at the boundary X of the central covering portion 140a and the outer covering portion 140b. If stress concentration occurs in the curved portion of the boundary X, the IC tag 100 will bend along the tangential line at the point of stress concentration.

However, if stress concentration occurs in the curved portion of the boundary X, the location of stress concentration will change continuously, and the location of bending of the IC tag 100 will also change accordingly.

Therefore, in this embodiment, the IC tag 100 is prevented from bending repeatedly at the same location. In consequence, it is possible to prevent, with improved reliability, a break in the antenna part 120, breakage of the film member 110, or separation of the covering 140 in the IC tag 100 from occurring.

In the IC tag 100 according to this embodiment, the width of the central covering portion 140a along the direction of the long side of the IC tag 100 is narrowed in the region in which the curved portions of the boundaries X of the central covering portion 140a and the outer covering portions 140b are located. In consequence, when an external force tending to bend the IC tag 100 along the direction of the long side thereof acts on it, the IC tag 100 is apt to bend at the position P at which the curved portions of the boundaries X of the central covering portion 140a and the outer covering portions 140b are located, as shown in FIG. 3. Therefore, even when such an external force acts on the IC tag 100, the IC tag is not likely to bend at the position at which the connection of the IC chip 130 and the antenna part 120 is located. In consequence, breakage of the connection of the IC chip 130 and the antenna part 120 can be prevented.

(Modification)

Figure 4:
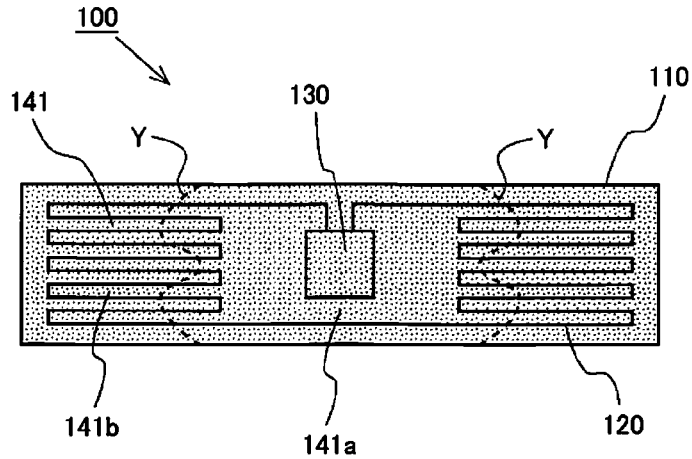
FIG. 4 shows the basic construction of an IC tag according to a modification of the first embodiment.

The shape of the boundary of the central covering portion and the outer covering portion in the covering of the IC tag according to this embodiment is not limited to the shape shown in FIG. 1. In the following, a modification of the IC tag according to the embodiment will be described with reference to FIG. 4. FIG. 4 is a plan view of an IC tag according to the modification seen from the side on which an IC chip is mounted. The IC tag according to this modification differs from the IC tag shown in FIG. 1 only in the shape of the covering. Therefore, components the same as those shown in FIG. 1 will be denoted by the same characters to allow the omission of descriptions thereof.

In this modification, the side of the IC tag 100 on which the IC chip 130 is mounted is covered, in its entirety, with a covering 141 made of an elastic member. As is the case with the covering 140 shown in FIG. 1, the central covering portion 141a of the covering 141 that covers the region about the IC chip 130 is thicker than the outer covering portions 141b of the covering 141 that cover the regions outside the region about the IC chip 130.

The shapes of the boundaries Y of the central covering portion 141a and the outer covering portions 141b are different from the shapes of the boundaries X of the central covering portion 140a and the outer covering portions 140b in the covering 140 shown in FIG. 1. Specifically, as shown in FIG. 4, the covering 141 is configured in such a way that the boundaries Y have corrugated shapes. In addition, the width of the central covering portion 141a along the direction of the long side of the IC tag 100 at the position at which the connection of the IC chip 130 and the antenna part 120 is located is larger than its width at positions shifted from that position in the direction of the short side of the IC tag 100.

In the case where the boundaries Y of the central covering portion 141a and the outer covering portions 141b are curved throughout their entirety as is the case with this embodiment also, stress tends to concentrate at some point on the boundaries Y when an external force such as bending force or twisting force acts on the IC tag 100. If stress concentration occurs at some point in the boundaries, the IC tag 100 will bend along the tangential line at the point of stress concentration.

However, since the boundaries Y are curved, the location of stress concentration in the boundaries Y will change continuously, and the position of bending of the IC tag 100 will also change accordingly. Therefore, the configuration like this modification also can prevent the IC tag 100 from being bent repeatedly at the same location. In consequence, it is possible to prevent, with improved reliability, a break in the antenna part 120, breakage of the film member 110, or separation of the covering 140 in the IC tag from occurring.

In the case of this modification also, when an external force tending to bend the IC tag 100 along the direction of the long side thereof acts on it, the IC tag 100 is apt to bend at a position at which the width of the central covering portion 141a along the direction of the long side of the IC tag 100 is small. Therefore, the IC tag 100 is not likely bend at the position at which the connection of the IC chip 130 and the antenna part 120 is located, at which the width of the central covering portion 141a along the direction of the long side of the IC tag 100 is large. In consequence, breakage of the connection of the IC chip 130 and the antenna part 120 can be prevented.

The shape of the boundary of the central covering portion and the outer covering portion in the covering of the IC tag according to this embodiment is not limited to that shown in FIG. 1 or 4. The point is that the boundary is partly curved so that the location of stress concentration changes continuously in the curved portion. However, in order to prevent bending from occurring at the position at which the connection of the IC chip 130 and the antenna part 120 is located when an external force tending to bend the IC tag 100 along the direction of the long side thereof acts on it, it is necessary that the width of the central covering portion along the direction of the long side of the IC tag 100 be smaller at positions shifted from the position at which the connection of the IC chip 130 and the antenna part 120 is located in the direction of the short side of the IC tag 100 than at the position at which the connection of the IC chip 130 and the antenna part 120 is located.

<Second Embodiment>
(Basic Construction of IC Tag)

FIG. 5 is a diagram showing the basic construction of an IC tag according to this embodiment. Components the same as those in the IC tag according to the above-described first embodiment will be denoted by the same characters to allow the omission of descriptions thereof. FIG. 5(a) is a plan view of the IC tag according to this embodiment seen from the side on which an IC chip is mounted. FIG. 5(b) is a schematic cross sectional view of the IC tag according to the embodiment taken along line A-A in FIG. 5(a)

The IC tag 100 according to this embodiment differs from the IC tag according to the first embodiment in that the central covering portion 140a is provided with protruding portions 140c that protrude upward (in FIG. 5(b)) beyond the top surface of the portion of the central covering portion 140a that covers the IC chip 130. The protruding portions 140c are provided at positions opposed to each other with the IC chip 130 therebetween with respect to the direction of the long side of the IC tag 100. Each of the protruding portions 140c extends along the direction of the short side of the IC tag 100.

In FIG. 5, the protruding portions 140c extend from one long side of the IC tag 100 to the other. However, this is not essential. The point is that the protruding portions 140c are provided at positions opposed to each other with the IC chip 130 therebetween, and it is not necessary for them to reach the long sides of the IC tag 100.

(Advantages of the IC Tag According to this Embodiment)

In this embodiment, when a pushing load acts on the IC tag 100 from above the IC chip 130, stress will concentrate at the portions of the central covering portion 140a having the protruding portions 140c. Therefore, stress acting on the IC chip 130 and stress acting on the connection of the IC chip 130 and the antenna part 120 can be reduced. In consequence, breakage of the IC chip 130 and breakage of the connection of the IC chip 130 and the antenna part 120 can be prevented from occurring with improved reliability.

(Modifications)

The configuration of the protruding portions in the central covering portion of the IC tag according to this embodiment is not limited to that shown in FIG. 5. In the following, modifications of the IC tag according to this embodiment will be described with reference to FIGS. 6 to 8. FIGS. 6 to 8 are plan views of IC tags according to the modifications seen from the side on which an IC chip is mounted. The modifications shown in these drawings differ from the IC tag shown in FIG. 5 only in the configuration of the protruding portions in the central covering portion. Therefore, components the same as those in FIG. 5 will be denoted by the same characters to allow the omission of descriptions thereof.

In the modification shown in FIG. 6, the central covering portion 140a has protruding portions 140d provided at positions opposed to each other with the IC chip 130 therebetween with respect to the direction of the short side of the IC tag 100, and the protruding portions extend along the direction of the long side of the IC tag 100.

In the modification shown in FIG. 7, the central covering portion 140a has a protruding portion 140e configured to have a rectangular U-shape surrounding the IC chip 130. The rectangular U-shaped protruding portion 140e has two mutually opposed sides arranged on both sides of the IC chip 130 with respect to the direction of the long side of the IC tag 100 and extending along the direction of short side of the IC tag 100 and the other one side arranged on the side opposite to the position of the connection of the IC chip 130 and the antenna part 120 and extending along the direction of the long side of the IC tag 100.

In the modification shown in FIG. 8, the central covering portion 140a has a protruding portion 140f configured to surround the IC chip 130 on all sides thereof. Specifically, the protruding portion 140f has a pair of sides opposed to each other arranged on both sides of the IC chip 130 with respect to the direction of the long side of the IC tag 100 and extending along the direction of the short side of the IC tag 100 and the other one pair of sides opposed to each other arranged on both sides of the IC chip 130 with respect to the direction of the short side of the IC tag 100 and extending along the direction of the long side of the IC tag 100.

In the cases of the configurations of the protruding portions in the central covering portion shown in FIGS. 6 to 8 also, when a pushing load acts on the IC tag 100 from above the IC chip 130, stress will concentrate at the portions of the central covering portion 140a having the protruding portions 140c. Therefore, stress acting on the IC chip 130 and stress acting on the connection of the IC chip 130 and the antenna part 120 can be reduced. In consequence, breakage of the IC chip 130 and breakage of the connection of the IC chip 130 and the antenna part 120 can be prevented from occurring with improved reliability.

The configuration of the protruding portions in the central covering portion of the IC tag according to this embodiment is not limited to those shown in FIGS. 5 to 8. The point is that the protruding portions are provided at positions opposed to each other with the IC chip 130 therebetween or the positions surrounding the IC chip 130 on all sides thereof and protruding beyond the top surface of the portion covering the IC chip 130.

<Third Embodiment>
(Basic Construction of the IC Tag)

FIG. 9 shows the basic construction of an IC tag according to this embodiment. Components the same as those in the IC tag according to the first embodiment will be denoted by the same characters to allow the omission of descriptions thereof. FIG. 9(a) is a plan view of the IC tag according to the embodiment seen from the side on which an IC chip is mounted. FIG. 9(b) is a schematic cross sectional view of the IC tag according to the embodiment taken along line A-A in FIG. 9(a).

The IC tag 100 according to this embodiment differs from the IC tag according to the first embodiment in that not only the side of the IC tag 100 on which the IC chip 130 is mounted but also the other side thereof is covered in its entirety with a covering 150 made of an elastic material. The thickness of this covering 150 is smaller than the thickness of the covering 140 that covers the side on which the IC chip 130 is mounted.

(Advantages of the IC Tag According to this Embodiment)

In this embodiment, since the side of the IC tag 100 other than the side on which the IC chip 130 is mounted is covered with the covering 150, the surface of the body of the IC tag 100 on the side other than the side on which the IC chip 130 is mounted (or the surface of the film member 110 on the side other than the side on which the IC chip 130 is mounted) is prevented from being exposed to solution used in the washing process, when the IC tag 100 is washed in the laundry. Therefore, the IC tag 100 can be prevented from breaking on the side other than the side on which the IC chip 130 is mounted.

Since the thickness of the covering 150 that covers the side other than the side on which the IC chip 130 is mounted is smaller than the covering 140 that covers the side on which the IC chip 130 is mounted, the overall thickness of the IC chip 130 can be prevented from becoming so large. In consequence, the IC tag 100 can be flexible even with the covering 150.

If the covering 150 is made of a rubber material having a large friction coefficient, when the IC tag 100 is attached to a linen object, the displacement of the IC tag 100 on the linen object can be restricted by frictional resistance. Therefore, bending of the IC tag 100 can be prevented from occurring.

(Modification)

In the following, a modification of the IC tag according to this embodiment will be described with reference to FIGS. 10(a) and 10(b). FIG. 10(a) is a plan view of the IC tag according to the modification seen from the side on which an IC chip is mounted. FIG. 10(b) is a schematic cross sectional view of the IC tag according to the modification taken along line A-A in FIG. 10(a). The IC tag according to the modification differs from the IC tag shown in FIG. 9 only in the construction of the covering that covers the side other than the side on which the IC chip is mounted. Therefore, components the same as those shown in FIG. 9 will be denoted by the same characters to allow the omission of descriptions thereof.

In this modification, the side of the IC tag 100 other than the side on which the IC chip 130 is mounted is covered in its entirety with a resin film 160 resistant against solution used in washing the linen object to which the IC tag 100 is attached in the laundry. Similar to the material of the film member 110, examples of the material of the resin film may include polyethylene terephthalate, polyethylene naphthalate, and polyimide. In particular, polyethylene naphthalate can preferably be used among them. This is because polyethylene naphthalate is superior in resistance against water, heat, and chemicals and low in water vapor transmission while having high mechanical strength.

The IC tag 100 according to this modification can also have flexibility while preventing the IC tag 100 from breaking on the side other than the side on which the IC chip 130 is mounted.

The construction according to this embodiment can also be employed in the IC tag according to the above-described second embodiment. Specifically, an IC tag may be provided with a protruding portion in a central covering portion that covers the side on which an IC chip is mounted and the side of the IC tag other than the side on which the IC chip is mounted may be covered with a covering made of an elastic material or a resin film according to this embodiment.

<Fourth Embodiment>

FIG. 11 shows the basic construction of an IC tag according to this embodiment. Components the same as those in the IC tag according to the first embodiment will be denoted by the same characters to allow the omission of descriptions thereof. FIG. 11(a) is a perspective view of the IC tag according to the embodiment. FIG. 11(b) is a schematic cross sectional view of the IC tag according to the embodiment taken along line A-A in FIG. 11(a). The antenna part is not illustrated in FIGS. 11(a) and 11(b).

In the IC tag 100 according to this embodiment, the boundaries Z of the central covering portion 140a and the outer covering portions 140b in the covering 140 are curved inwardly in the central region with respect to the direction of the short side of the IC tag 100, as is the case in the IC tag shown in FIG. 1. Moreover, in this embodiment, the boundaries Z are configured to form slopes inclined from the central covering portion 140a outwardly toward the outer covering portions 140b.

Moreover, in the IC tag 100 according to this embodiment, the central covering portion 140a is provided with a protruding portion 140g that protrudes beyond the top surface of the portion covering the IC chip 130 and extends in such a way as to surround the IC chip 130 on all sides thereof, as is the case in the IC tag 100 shown in FIG. 8. In this embodiment, furthermore, the outer circumference W of the protruding portion 140g is configured to form a slope inclined downwardly in the outward direction.

Moreover, in the IC tag 100 according to this embodiment, the side of the IC tag 100 other than the side on which the IC chip 130 is mounted is covered in its entirety with a covering 150 made of an elastic material and having a thickness smaller than the thickness of the covering 140 that covers the side on which the IC chip 130 is mounted, like in the case of the IC tag shown in FIG. 9.

(Advantages of the IC Tag According to this Embodiment)

The slopes formed, like in this embodiment, in the boundaries Z of the central covering portion 140a and the outer covering portions 140b of the covering 140 and the slope formed in the outer circumference W of the protruding portion 140g in the central covering portion 140a facilitate processing in providing the covering 140 on the film member 110 on which the IC chip 130 is mounted.

The slopes formed in the boundaries of the central covering portion and the outer covering portion of the covering may also be employed in IC tags with no protruding portions in the central covering portion, like that according to the first embodiment. The slope in the outer circumference of the protruding portion in the central covering portion may also be employed in IC tags with protruding portions having different shapes, like that described as the second embodiment. In this embodiment also, the side of the IC tag other than the side on which the IC chip is mounted may be covered in its entirety with a resin film instead of the covering made of an elastic material, like in the case of the modification of the third embodiment.

DESCRIPTION OF THE REFERENCE SIGNS

100: IC tag
110: film member
120: antenna part
130: IC chip
140, 141: covering
140a, 141a: central covering portion
140b, 141b: outer covering portion
140c, 140d, 140e, 140f, 140g: protruding portion
150: covering
160: resin film

The invention claimed is:
1. An IC tag comprising:
a film member having a length direction that is longer than a width direction;
an antenna part provided on the film member;
an IC chip mounted on the film member in such a way as to be connected with the antenna part, wherein a covering made of an elastic material that covers at least a side of the film member on which the IC chip is mounted, the covering including a thick region covering the IC chip and a relatively thinner region that covers a portion of the film member where the IC chip is not mounted the covering is configured in such a way that at least a part of a boundary between the thick region and the relatively thinner region has a curved shape, and the antenna part is connected to one of the sides of the IC chip opposed to each other in the direction of the short side of the film member the curved shape is arranged in the width direction of the film member such that a width of the thick region in the length direction of the film member is shorter at positions shifted from a position at which the connection of the IC chip and the antenna part is located than at a position at which the connection of the IC chip and the antenna part is located.

* * * * *